3,332,841
METHOD OF TREATING HYPERACIDITY
Cameron Ainsworth and Ralph R. Pfeiffer, Indianapolis, Ind., assignors to Eli Lilly and Company, Indianapolis, Ind., a corporation of Indiana
No Drawing. Filed Oct. 4, 1961, Ser. No. 142,757
5 Claims. (Cl. 167—55)

This invention relates to therapeutic antacid compositions and processes, and to novel polymers possessing excellent antacid properties. More particularly, this invention is directed to antacid therapeutic compositions containing cross-linked polyalkyleneimine copolymers such as polyethyleneimine and polypropyleneimine polymers, and to methods of treatment of hyperacidity and conditions related thereto. This application is a continuation-in-part of our abandoned application Ser. No. 795,587, filed Feb. 26, 1959.

A number of properties characterize improved antacid compositions desired for therapy of hyperacidity and of the attendant pathology. Among the properties are the following: high acid neutralization capacity, a high degree of palatability, a relatively long neutralization action, and substantial freedom from side effects such as alkalosis, systemic ionic imbalance, diarrhea, and constipation.

An object of this invention is to provide antacid compositions having the above-specified properties.

Other objects will be apparent from the following disclosure.

In accordance with the above and other objects, we have provided new antacid compositions comprising a pharmaceutical extending medium with which there is associated a nontoxic, water-insoluble, solid, cross-linked polyalkyleneimine polymer wherein the alkylene moiety preferably contains 2 to 4 carbon atoms. The cross-linked polyalkyleneimine polymers employed in this invention are provided by cross-linking a polyalkyleneimine with linking groups containing from about 2 to 10 carbon atoms, and having a molecular weight of about 20 to about 200. The cross-links of the cross-linked polyalkyleneimine polymers employed in this invention constitute bridges connecting nitrogen atoms of a polyakyleneimine, the cross-links coupling with the nitrogen atoms by means of carbon to nitrogen bonds. In general, the polyalkyleneimine polymers of this invention are polyethyleneimine and polypropyleneimine polymers, the polyethyleneimine polymers presently being especially preferred.

Any polyalkyleneimine preparation can be employed as starting material in the preparation of the cross-linked polymers employed in the compositions of the invention if cross-linked polyalkyleneimine polymers of a solid character are provided thereby. It has been found desirable to employ polyalkyleneimine preparations which have the higher average molecular weights since, in general, the larger the average molecular weight, the better the pharmaceutical characteristics of the cross-linked polyalkyleneimine polymeric products. Commercially available polyalkyleneimine polymer preparations have been found to be satisfactory for the preparation of cross-linked polymers, for example, a 50 percent by weight aqueous solution of polyethyleneimine or polypropyleneimine.

A number of agents can be employed to provide the cross-links having the properties set forth above. The cross-linking agents include lower alkyl esters of polybasic carboxylic acids such as malonic, succinic, maleic, fumaric, adipic, terephthalic, citric, and tartaric acids; lower alkyl esters of lower alkenyl monobasic carboxylic acids such as methyl acrylate, ethyl methacrylate, and ethyl acrylate; polymethylene halides such as ethylene bromide, ethylene chloride, trimethylene bromide, hexamethylene bromide, octamethylene bromide, and glyceryldichlorohydrin; compounds having epoxide functional groups such as epichlorohydrin, epibromohydrin, and butadiene dioxide; esters of halo-substituted alkylmonobasic acids such as ethyl chloroacetate and methyl β-chloropropionate, and acid halides of such halo-substituted acids; and the like. Presently preferred cross-linking agents are epichlorohydrin, succinate esters, acrylate esters, and butadiene dioxide.

Butadiene dioxide is especially preferred as a cross-linking agent, as novel polyalkyleneimine polymers are produced therewith which exhibit superlative antacid properties. Thus, an embodiment of this invention is a nontoxic water-insoluble, solid cross-linked polyalkyleneimine polymer wherein said polyalkyleneimine polymer is cross-linked with butadiene dioxide. Such a cross-linked polyalkyleneimine polymer is obtained by reacting the polyalkyleneimine with butadiene dioxide, thereby providing 2,3-dihydroxytetramethylene cross-links coupling with polyalkyleneimine nitrogen atoms by means of carbon to nitrogen bonds. Thus, the butadiene dioxide is attached at each end to polyalkyleneimine nitrogen atoms— the cross-linking moiety being 2,3-dihydroxytetramethylene. It is preferred that the novel polyalkyleneimine polymer contains 2 to 4 carbon atoms in the alkylene moiety, as, for example, do polypropyleneimine and polyethyleneimine. A highly preferred polymer is a nontoxic water-insoluble cross-linked polyethyleneimine polymer wherein said polyethyleneimine polymer is cross-linked with butadiene dioxide, since this polymer, either alone or when formulated in an antacid preparation, exhibits excellent antacid properties.

The cross-linked polyalkyleneimine polymers are prepared by reacting a polyalkyleneimine and a cross-linking agent in the presence of an inert solvent. The solvent can be water or an aqueous solvent mixture containing a percentage of a water-miscible, inert organic solvent such as dimethyl formamide or a lower alcohol, for example, methanol, ethanol, or propanol. When an aqueous solvent mixture containing about 0.1 to 2 parts of such an inert organic solvent is employed for each part of water, it has been found that the reaction is generally more efficient.

A satisfactory cross-linked polyalkyleneimine polymeric product is provided by the addition with stirring of about 0.10 to 1.0 part by weight of cross-linking agent for each part of polyalkyleneimine employed. The reaction is permitted to proceed for a sufficient time to provide the desired solid, cross-linked polyalkyleneimine polymer, a 15- to 20-hour period being generally ample. At the end of the reaction period, the reaction product is thoroughly washed to remove unwanted reaction products as well as any excessive reactants. For example, to remove halide, the washing can be accomplished by permitting the reaction product to stand for several hours in alkaline aqueous solution, such as 1 N sodium hydroxide, followed by thorough water washing.

A preferred polymeric product having superior grinding and formulating characteristics is obtained employing about 0.2 to about 0.6 part by weight of epichlorohydrin as cross-linking agent for each part of polyethyleneimine. In addition, a highly preferred, smooth product can be obtained directly without grinding and sizing by employing about 0.01 to about 0.19 part by weight of epichlorohydrin for each part of polyethyleneimine.

When the cross-linked polymer is a grindable solid, it is finely comminuted, desirably to a particle size of sufficient fineness to permit passage through a No. 100 screen of the U.S.P. sieve series. Preferably, the final particle size falls in the range of about $1\mu$ to about $100\mu$. The fine particle size permits a more efficient utilization of the polymer as an antacid, and also aids in the formulation of the polymer into a palatable antacid composition.

The comminution can be effected either in the wet or dry state by conventional grinding means. To circumvent any grinding difficulties which might occasionally arise as a result of some slight tendency toward gumminess of some of the cross-linked polymers, it is at times desirable to carry out the grinding with the polymer in the frozen state; this is readily accomplished by mixing solid carbon dioxide with the polymer, and grinding the mixture.

On completion of grinding, the ground medicament is blended with a suitable pharmaceutical extending medium and fabricated into tablets, filled capsules, creams, or suspensions and the like, following procedures well known to the art. The preparations can, and desirably do, contain additional ingredients such as suspending agents, binders, bonding agents, preservatives, flavors, coloring agents and the like.

The range of doses of the solid, cross-linked polymers employed in this invention varies widely as is customary in antacid therapy. The administration of a dose of about 0.25 to 5 g. of the cross-linked polyalkyleneimine medicament will relieve normally encountered hyperacidity of the transient type. However, it is to be understood that the doses required vary depending upon the patient, and the nature and acuteness of the gastric hyperacidity.

The following examples more fully illustrate the invention:

*Example 1.—Preparation of cross-linked polyethyleneimine polymer employing epichlorohydrin as cross-linking agent*

3 l. of ethanol and 1.5 kg. of polyethyleneimine in 1.5 l. of water are combined, and the mixture is cooled to about 15° C. 600 ml. of epichlorohydrin are added with stirring to the ethanol mixture. Upon completion of the addition of the epichlorohydrin, the reaction mixture is transferred to glass trays to a depth of about 2 inches and is permitted to stand for a 24-hour period. The reaction product is removed from the glass trays and ground with a hammer mill. The solid, ground product of cross-linked polyethyleneimine polymer is washed by permitting the polymeric product to stand in 12 l. of 1 N sodium hydroxide for 24 hours. The sodium hydroxide mixture is filtered. The precipitate of cross-linked polyethyleneimine polymer is washed repeatedly with water until the pH of the aqueous wash reaches about neutrality. The washed, cross-linked polyethyleneimine polymeric product is air dried with hot air at 125° C. until the final product has about 5 percent water by weight. The final product is a white, grindable solid.

Whereas the above product is a grindable solid, a smooth paste-like solid can be provided as follows: Two hundred grams of 50 percent aqueous polyethyleneimine and 4 ml. of epichlorohydrin were mixed and allowed to stand at room temperature for 3 days. The Artgum eraser-like material was ground in a mortar with water and then was collected by suction filtration. The moist material, containing 80 percent water, was diluted with an equal weight of water and roller milled to yield a smooth, tasteless paste that was flavored and sweetened. The titration value of this product was 130 ml. 0.1 N HCl/g. on a dry basis, clearly demonstrating the highly desirable antacid properties of this formulation.

*Example 2.—Preparation of cross-linked polyethyleneimine polymer employing ethylene bromide as cross-linking agent*

18.8 g. of ethylene bromide are added with stirring to 50 g. of polyethyleneimine in 50 ml. of water. The mixture is continuously stirred for about ten minutes and is then allowed to stand for a few hours, whereupon it polymerizes and becomes solid. The solid product is pulverized in a mortar, 1 liter of 1 N sodium hydroxide is added to the pulverized product, and the mixture is stirred for 48 hours. The basic mixture is filtered to remove the sodium hydroxide wash. The precipitate consisting of cross-linked polyethyleneimine polymer is repeatedly washed with hot water until the pH of the washes reaches neutrality. The dried product consisting of cross-linked polyethyleneimine polymer is finely ground with 5 parts by weight of coarsely ground Dry Ice to each part of the cross-linked polymer. The ground polyethyleneimine polymer is employed in formulating antacid compositions of this invention.

*Example 3.—Preparation of cross-linked polyethyleneimine polymer employing ethylene chloride as cross-linking agent*

Cross-linked polyethyleneimine polymer employing ethylene chloride as cross-linking agent is prepared following the process of Example 2 using 20 g. of ethylene chloride and 50 g. of polyethyleneimine in 50 ml. of water. The cross-linked polyethyleneimine polymeric product is washed, is dried, and is ground for formulation in the manner described in Example 2. The final product is a white, insoluble solid.

*Example 4.—Preparation of cross-linked polyethyleneimine polymer employing ethyl succinate as cross-linking agent*

17 g. of ethyl succinate are added with stirring to 60 g. of polyethyleneimine in 60 ml. of water. The mixture is continuously stirred for 10 minutes. The reaction mixture solidifies after standing for about two days. The solid product consisting of the cross-linked polyethyleneimine polymer is ground and is washed with 200 ml. of ethyl alcohol. The alcohol wash is removed by filtration, and the cross-linked polymeric product is washed two times with 1 liter quantities of hot water. The washed cross-linked polymeric product, which is a white, insoluble solid, is air dried, and is ground for formulation.

*Example 5.—Preparation of cross-linked polyethyleneimine polymer employing ethyl maleate as cross-linking agent*

Cross-linked polyethyleneimine polymer employing ethyl maleate as cross-linking agent is prepared according to the procedure described in Example 4, using 50 g. of polyethyleneimine in 50 ml. of water and 10 g. of ethyl maleate. The cross-linked product is a white, insoluble solid.

*Example 6.—Preparation of cross-linked polyethyleneimine polymer employing ethyl fumarate as cross-linking agent*

Cross-linked polyethyleneimine polymer employing ethyl fumarate as cross-linking agent is prepared according to the procedure described in Example 4, using 10 g. of polyethyleneimine in 10 ml. of water and 1 g. of ethyl fumarate. The cross-linked product is a white, insoluble solid.

*Example 7.—Preparation of cross-linked polyethyleneimine polymer employing ethyl adipate as cross-linking agent*

Cross-linked polyethyleneimine polymer employing ethyl adipate as cross-linking agent is prepared according to the procedure described in Example 4, using 5 g. of polyethyleneimine in 5 ml. of water and 1 g. of ethyl adipate. The cross-linked product is a white, insoluble solid.

*Example 8.—Preparation of cross-linked polyethyleneimine polymer employing ethyl terephthlate as cross-linking agent*

Cross-linked polyethyleneimine polymer employing ethyl terephthlate as cross-linking agent is prepared according to the procedure described in Example 4, using 5 g. of polyethyleneimine in 5 ml. of water and 1 g. of ethyl terephthlate. The cross-linked product is a white, insoluble solid,

*Example 9.—Preparation of cross-linked polyethyleneimine polymer employing ethyl citrate as cross-linking agent*

Cross-linked polyethyleneimine polymer employing ethyl citrate as cross-linking agent is prepared according to the procedure described in Example 4, using 10 g. of polyethyleneimine in 10 ml. of water and 2 g. of ethyl citrate. The cross-linked product is a white, insoluble solid.

*Example 10.—Preparation of cross-linked polyethyleneimine polymer employing ethyl tartrate as cross-linking agent*

Cross-linked polyethyleneimine polymer employing ethyl tartrate as cross-linking agent is prepared according the procedure described in Example 4, using 5 g. of polyethyleneimine in 5 ml. of water and 1 g. of ethyl tartrate. The cross-linked product is a white, insoluble solid.

*Example 11.—Preparation of cross-linked polyethyleneimine polymer employing ethyl malonate as cross-linking agent*

Cross-linked polyethyleneimine polymer employing ethyl malonate as cross-linking agent is prepared according to the procedure described in Example 4, using 5 g. of polyethyleneimine in 5 ml. of water and 1 g. of ethyl malonate. The cross-linked product is a white, insoluble solid.

*Example 12.—Preparation of cross-linked polyethyleneimine polymer employing trimethylene bromide as cross-linking agent*

Cross-linked polyethyleneimine polymer employing trimethylene bromide as cross-linking agent is prepared according to the procedure described in Example 2, using 5 g. of polyethyleneimine in 5 ml. of water and 1 g. of trimethylene bromide. The cross-linked product is a white, insoluble solid.

*Example 13.—Preparation of cross-linked polyethyleneimine polymer employing hexamethylene bromide as cross-linking agent*

Cross-linked polyethyleneimine polymer employing hexamethylene bromide as cross-linking agent is prepared according to the procedure described in Example 2, using 5 g. of polyethyleneimine in 5 ml. of water and 1 g. of hexamethylene bromide. The cross-linked product is a white, insoluble solid.

*Example 14.—Preparation of cross-linked polyethyleneimine polymer employing octamethylene bromide as cross-linking agent*

Cross-linked polyethyleneimine polymer employing octamethylene bromide as cross-linking agent is prepared according to the procedure described in Example 2, using 10 g. of polyethyleneimine in 10 ml. of water and 2 g. of octamethylene bromide. The cross-linked product is a white, insoluble solid.

*Example 15.—Preparation of cross-linked polyethyleneimine polymer employing methyl methacrylate as cross-linking agent*

Cross-linked polyethyleneimine polymer employing methyl methacrylate as cross-linking agent is prepared according to the procedure described in Example 4, using 10 g. of polyethyleneimine in 10 ml. of water and 2 g. of methyl methacrylate. The cross-linked product is a white, insoluble solid.

*Example 16.—Preparation of cross-linked polyethyleneimine polymer employing methyl acrylate as cross-linking agentt*

Cross-linked polyethyleneimine polymer employing methyl acrylate as cross-linking agent is prepared according to the procedure described in Example 4, using 14 g. of polyethyleneimine in 14 ml. of water and 3 g. of methyl acrylate. The cross-linked product is a white, insoluble solid.

*Example 17.—Preparation of cross-linked polyethyleneimine polymer employing butadiene dioxide as cross-linking agent*

Cross-linked polyethyleneimine polymer employing butadiene dioxide as cross-linking agent is prepared according to the procedure described in Example 4, using 5 g. of polyethyleneimine in 5 ml. of water and 2 g. of butadiene dioxide. The cross-linked product is a white, grindable, insoluble solid.

Whereas the above product is a grindable solid, a smooth paste-like solid can be produced as follows: 1200 g. of 50 percent polyethyleneimine and 50 ml. (from 5 to 100 ml. gives an equally desirable cross-linked polymer) of butadiene dioxide were stirred vigorously for two minutes. A solid formed and, after standing for two hours, the product was ground (a roller mill can be used) and washed with water. An aqueous suspension of the cross-linked polymer was treated with carbon dioxide gas to give a tasteless product that was collected by suction filtration. This product contained 65 percent water by weight and neutralized 134 ml. of 0.1 N HCl per gram on a dry basis.

*Example 18.—Preparation of compressed tablets*

500 g. of cross-linked polyethyleneimine polymer prepared as described in Example 1 and 1500 g. of lactose are combined, are thoroughly mixed, and are triturated to a fine state of subdivision. The mixture is wet granulated using 160 g. of potato starch and 38 g. of gelatin in water as granulating agents. The wetted mixture is thoroughly mixed and kneaded. The kneaded mass is forced through a No. 10 screen, is air dried at 100° C. for 16 hours, and is passed through a No. 20 screen. 12 g. of stearic acid are added to the screened granulation mixture and the mixture is thoroughly blended to provide an even distribution of the ingredients. Employing a 9/16 inch concave punch, the blended mixture is compressed into tablets having an average weight of about 1.1 g. Each tablet contains about 250 mg. of the cross-linked polyethyleneimine polymer.

*Example 19.—Preparation of an antacid liquid suspension*

The cross-linked polyethyleneimine polymer prepared as described in Example 1 is formulated into a pharmaceutical suspension as follows:

18 g. of the cross-linked polymer and 82 ml. of sterile distilled water are thoroughly mixed in a Waring Blendor. The suspension contains 17 percent by weight of the cross-linked polymeric medicament. A small amount of flavoring is added, and the mixture is bottled.

*Example 20.—Preparation of antacid capsules*

10 kg. of polyethyleneimine polymer as provided by Example 1 is uniformly mixed with 16.8 kg. of talcum powder. The mixture is filled in 670 mg. amounts into No. 0 gelatin capsules.

Cross-linked polypropyleneimine polymers are prepared and formulated in a manner similar to the preparation and formulation of cross-linked polyethyleneimine polymers. The following example illustrates such a preparation of a polypropyleneimine polymer wherein the cross-linking agent is epichlorohydrin.

*Example 21*

30 g. of 50 percent aqueous polypropyleneimine (viscosity 150 poises) and 6 ml. of epichlorohydrin are mixed together to form a smooth paste and then allowed to stand at room temperature for about 16 hours. An Art-gum eraser-like material is obtained. This material is triturated with 200 ml. of 1 N NaOH, then washed with water to near neutrality, and air dried. The solid final product, polypropyleneimine polymer cross-linked with epichlorohydrin, is obtained in a yield of 17 g.

Likewise, employing the procedures of Examples 1 through 17, with the exception that similar amounts of polypropyleneimine are employed in place of the specified amounts of polyethyleneimine, cross-linked polypropyleneimine polymers wherein the cross-linking agents are epichlorohydrin, ethylene bromide, ethylene chloride, ethyl succinate, ethyl maleate, ethyl fumarate, ethyl adipate, ethyl terephthalate, ethyl citrate, ethyl tartrate, ethyl malonate, trimethylene bromide, hexamethylene bromide, octamethylene bromide, methyl methacrylate, methyl acrylate, and butadiene dioxide are obtained. These cross-linked polypropyleneimine polymers are then readily formulated as antacid preparations in the form of compressed tablets, liquid suspensions, or capsules, employing the procedures of Examples 18 through 20.

In general, the polyalkyleneimine polymers utilized in this invention have a molecular weight ranging from about 800 to about 100,000, and usually about 20,000 to about 40,000. Those having an average molecular weight of about 30,000 to 40,000 are preferred, since these latter materials are particularly economical and commercially available. In general, the polyalkyleneimine polymers utilized herein have a viscosity at 20° C., ranging from about 10,000 to 35,000 centipoises.

We claim:
1. A method of treating hyperacidity which comprises orally administering to a subject suffering from hyperacidity between about 0.25 and about 5 g. of a composition consisting essentially of a nontoxic, water-insoluble, solid, cross-linked polyalkyleneimine polymer selected from the group consisting of polyethyleneimine and polypropyleneimine, the cross-links therein having 2 to 10 carbon atoms, having a molecular weight between about 20 and about 200, and being attached at each end to polyalkyleneimine nitrogen atoms.

2. A method of treating hyperacidity which comprises orally administering to a subject suffering from hyperacidity between about 0.25 and about 5 g. of a composition consisting essentially of a nontoxic, water-insoluble, solid, cross-linked polyethyleneimine polymer, the cross-links therein having 2 to 10 carbon atoms, having a molecular weight between about 20 and about 200, and being attached at each end to polyethyleneimine nitrogen atoms.

3. A method of treating hyperacidity which comprises orally administering to a subject suffering from hyperacidity between about 0.25 and about 5 g. of a composition consisting essentially of a nontoxic, water-insoluble, solid, cross-linked polyethyleneimine polymer, the cross-links therein having 3 to 4 carbon atoms, having a molecular weight between about 40 and about 100, and being attached at each end to polyethyleneimine nitrogen atoms.

4. A method of treating hyperacidity which comprises orally administering to a subject suffering from hyperacidity between about 0.25 and about 5 g. of a composition consisting essentially of a nontoxic, water-insoluble, solid, cross-linked polyethyleneimine polymer, the cross-links therein being provided by reacting polyethyleneimine with butadiene dioxide and being attached at each end to polyethyleneimine nitrogen atoms.

5. A method of treating hyperacidity which comprises orally administering to a subject an effective quantity of a composition consisting essentially of a nontoxic, water-insoluble, solid, cross-linked polyethyleneimine polymer, obtained by reacting epichlorohydrin with polyethyleneimine in a weight ratio between about 0.2:1 and about 0.6:1, whereby cross-links are provided in said polymer, joined at each end to polyethyleneimine nitrogen atoms, the dosage being sufficient to provide between about 0.25 and about 5 grams of said polyethyleneimine polymer.

References Cited

UNITED STATES PATENTS

| | | | |
|---|---|---|---|
| 2,257,162 | 9/1941 | Esselmann | 260—2 |
| 2,554,072 | 5/1951 | Sullivan | 167—72 |
| 2,597,439 | 5/1952 | Bodamer | 167—72 |
| 2,626,931 | 1/1953 | Bestian | 260—2 |
| 2,774,710 | 12/1956 | Wade | 167—55 |
| 2,868,693 | 1/1959 | Shive | 167—55 |
| 2,901,443 | 8/1959 | Starck | 260—2 |
| 2,934,472 | 4/1960 | May | 167—55 |
| 3,115,490 | 12/1963 | Smith | 260—2 |
| 3,224,940 | 12/1965 | Ainsworth | 167—55 |

FOREIGN PATENTS

| | | |
|---|---|---|
| 567,738 | 12/1958 | Canada. |
| 461,354 | 2/1937 | Great Britain. |
| 466,270 | 5/1937 | Great Britain. |
| 466,344 | 5/1937 | Great Britain. |
| 488,553 | 7/1938 | Great Britain. |
| 834,883 | 5/1960 | Great Britain. |

OTHER REFERENCES

Wolf: Chem. Abst., vol. 53, p. 8480(d), 1959, abstract of Ger. Patent No. 14,852, July 4, 1958.

Dale: J. Am. Pharm. Assoc., vol. 44, No. 3, pp. 170–177, March 1955.

SAM ROSEN, *Primary Examiner.*

JULIAN S. LEVITT, FRANK CACCIAPAGLIO,
*Examiners.*

P. SABATINE, *Assistant Examiner.*